Feb. 2, 1971 P. A. HARDING 3,560,943

MEMORY ORGANIZATION FOR TWO-WAY ACCESS

Filed Jan. 29, 1968 6 Sheets-Sheet 1

INVENTOR
P. A. HARDING
BY
Charles Scott Phelan
ATTORNEY

Feb. 2, 1971 P. A. HARDING 3,560,943

MEMORY ORGANIZATION FOR TWO-WAY ACCESS

Filed Jan. 29, 1968 6 Sheets-Sheet 2

Feb. 2, 1971 P. A. HARDING 3,560,943

MEMORY ORGANIZATION FOR TWO-WAY ACCESS

Filed Jan. 29, 1968 6 Sheets-Sheet 4

United States Patent Office 3,560,943

Patented Feb. 2, 1971

3,560,943

MEMORY ORGANIZATION FOR TWO-WAY ACCESS

Philip A. Harding, Aurora, Ill., assignor to Bell Telephone Laboratories, Incorporated, Murray Hill, N.J., a corporation of New York Filed Jan. 29, 1968, Ser. No. 701,172
Int. Cl. G11c 5/04, 7/00, 11/06
U.S. Cl. 340—174 21 Claims

ABSTRACT OF THE DISCLOSURE

A magnetic store system is organized on a 2-wire single-storage-element-per-bit basis for coincident current read and write. Sensing circuits are coupled to the memory along two different coordinates so that readout is realized along either of such two coordinates.

BACKGROUND OF THE INVENTION

Field of the invention

This invention relates to magnetic memory systems and it relates more particularly to such systems providing access for readout along two different memory coordinates.

Prior art

Memory systems are known which are capable of accessing for readout along different coordinates. These are sometimes called two-way memories. One example of such memories is an associative memory. Associative memories are often conceived in complex arrays which are capable of performing multibit information searches simultaneously on a plurality of memory word locations. Such associative memories are expensive because they require extensive logic at each bit storage location as well as complex logic outside of the memory for evaluating information derived from the memory.

There are some electric system applications which can use a searching capability such as is found in associative memories but which do not need the full multibit search capability. One such application is found in circuit condition scanning arrangements wherein it is necessary to search for a change in the signal state of a circuit. Such a state is often evidenced in storage by the binary condition of a status bit in the binary address word identifying each of the circuits to be scanned. There are memories known in the art which are capable of performing a single-bit associative search, but they usually employ one or more organization techniques which make them comparatively expensive. It has, therefore, been generally more economical to expend time for accomplishing a consecutive scan of the relevant circuits to look for a change of state therein instead of accomplishing an associative search.

For example, one single-bit associative search memory operates on a noncoincident current basis and is relatively costly for a number of reasons including the fact that three or more wires must be laced through each core of the memory to realize the desired type of operation. Furthermore, specialized core orientation schemes are required to facilitate the lacing of multiple leads through the cores, but such specialized orientation schemes are in themselves expensive as compared to a memory arrangement wherein all cores are uniformly oriented.

It is, therefore, one object of the present invention to reduce the cost of two-way memories.

It is another object to perform limited-bit associative searches.

A further object is to organize a coincident current, two-wire memory for readout operation on circuits along both coincident current drive coordinates of the memory.

SUMMARY OF THE INVENTION

The aforementioned and other objects of the invention are realized in an illustrative embodiment wherein circuits linking memory locations along both of two coincident current access coordinates are utilized in conjugate conduction modes to accommodate both driving and sensing functions along each such coordinate of the memory.

It is one feature of the invention that in a memory employing toroidal magnetic cores all of such cores are oriented in the same way in their respective memory planes.

It is another feature that in a memory wherein storage elements are magnetic cores the memory is operated on a 2-wire basis.

A further feature is that the conjugate nature of the memory coordinate circuits facilitates the realization of ordinary access matrix hardware savings as well as further savings arising from the fact that access circuits activated for applying memory drive signals also select, without further switching, the circuits to be sensed.

Yet another feature is that multiple memory planes are interconnected to be cooperatively included in the conjugate memory circuits.

DESCRIPTION OF THE DRAWING

The aforementioned and other objects and features of the invention may be better understood from a consideration of the following detailed description when taken together with the appended claims and the attached drawings in which:

DETAILED DESCRIPTION

Figure 1:
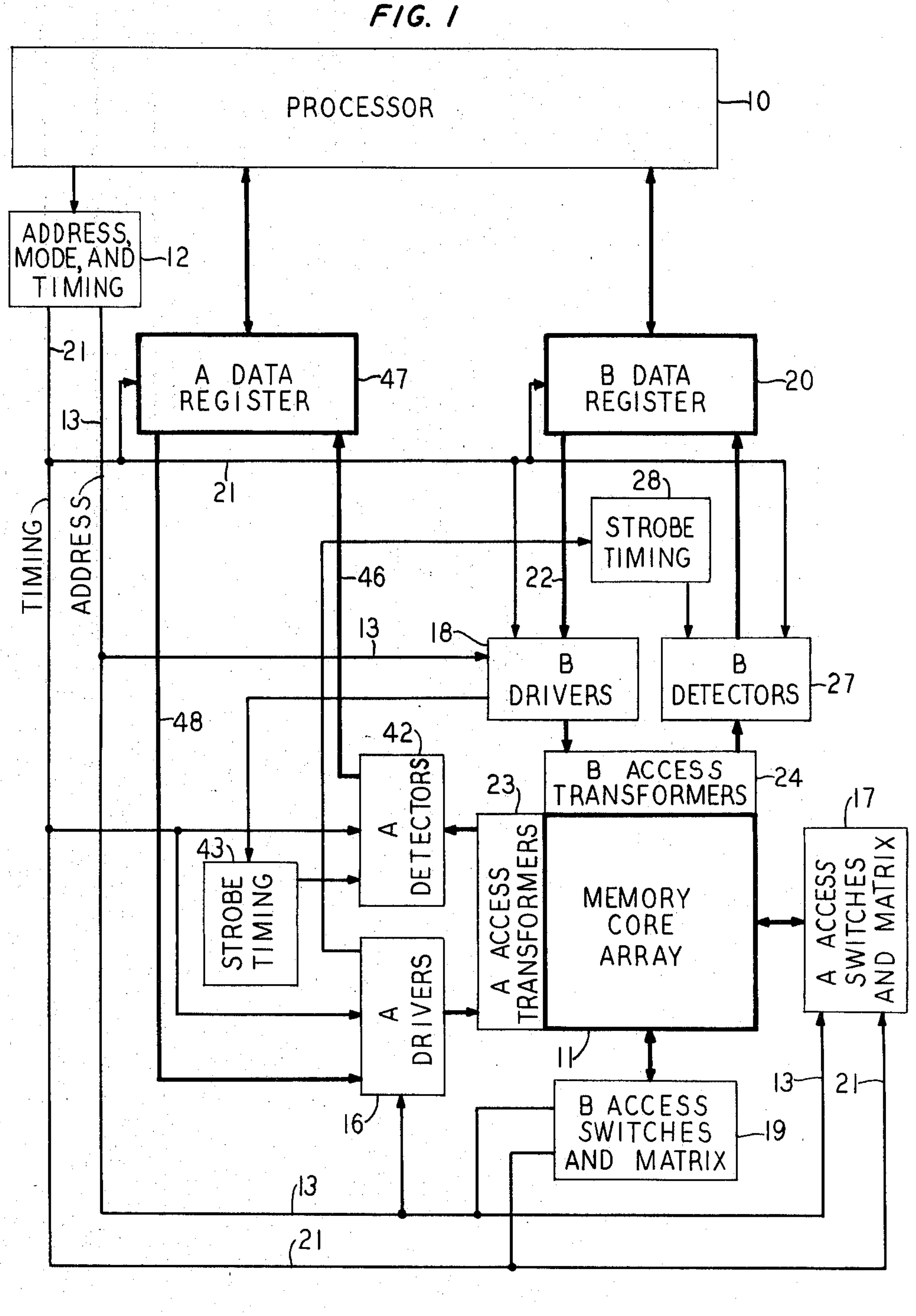
FIG. 1 is a generalized block and line diagram of a data processing system employing the present invention.

In FIG. 1 a data processor 10 is associated with a store system including a memory 11. They cooperate in a general manner which is known in the art by interchanging data, program, and address signals to enable the processor to perform its functions. One function of such a processing system, which is also known in the art, is to control an electronic switching system for signal communications. The present invention will be described, without limitation, in connection with one aspect of such a communication system wherein the signal state of a plurality of circuits (not shown) is monitored so that the processor may provide appropriate connections to those circuits in response to a change in the signal state thereon. Normally such a monitoring function is performed by a sequential scanning operation which consumes a substantial amount of time in the overall system operation. In accordance with one aspect of the present invention such a monitoring operation is performed on an associative search basis.

The broad lines interconnecting blocks in FIG. 1 represent bit-parallel data signal paths which are of particular interest in connection with the description of the present invention. The narrower lines interconnecting the blocks of FIG. 1 represent control circuits for providing timing, address, and mode control signals on either a single-bit or a bit-parallel basis. A bit-parallel path includes separate circuit paths for simultaneously transmitting a plurality of signals representing different information bits, respectively.

The memory array 11 comprises a plurality of bistable magnetic cores, or their equivalents, in which two stable states for representing the two signal states in a binary coded information system are available by appropriate switching of magnetic flux in the core material between the well known remanent flux states of opposite polarity. Circuits coupled to the magnetic memory locations are organized for accessing the memory to read out stored information along a selectable one of two sets of orthogonal coordinates defined by a rectangular coordinate array of memory storage locations. The two sets of coordinates are, for convenience, designated by A and B reference characters, respectively, in the drawings.

The store system of FIG. 1 is operable either in a normal read-write mode or in an associative search mode. In the latter mode information stored in selectable corresponding bit locations of plural memory word locations are read out. Upon the occurrence of a predetermined bit signal state in one of those bit locations, a predetermined group of bits representing the bits of the word location including that one bit are then read out. In this context, memory word and memory bit terminology are employed for convenience of description; but either of the A or B coordinates of the memory can be either the word or the bit coordinate. Both the normal and the search modes of memory operation inherently include read, write, and regenerate functions available in any sequences that may be required by program stored in memory and employed for controlling the cooperative functioning of the memory and the processor.

Figure 2:
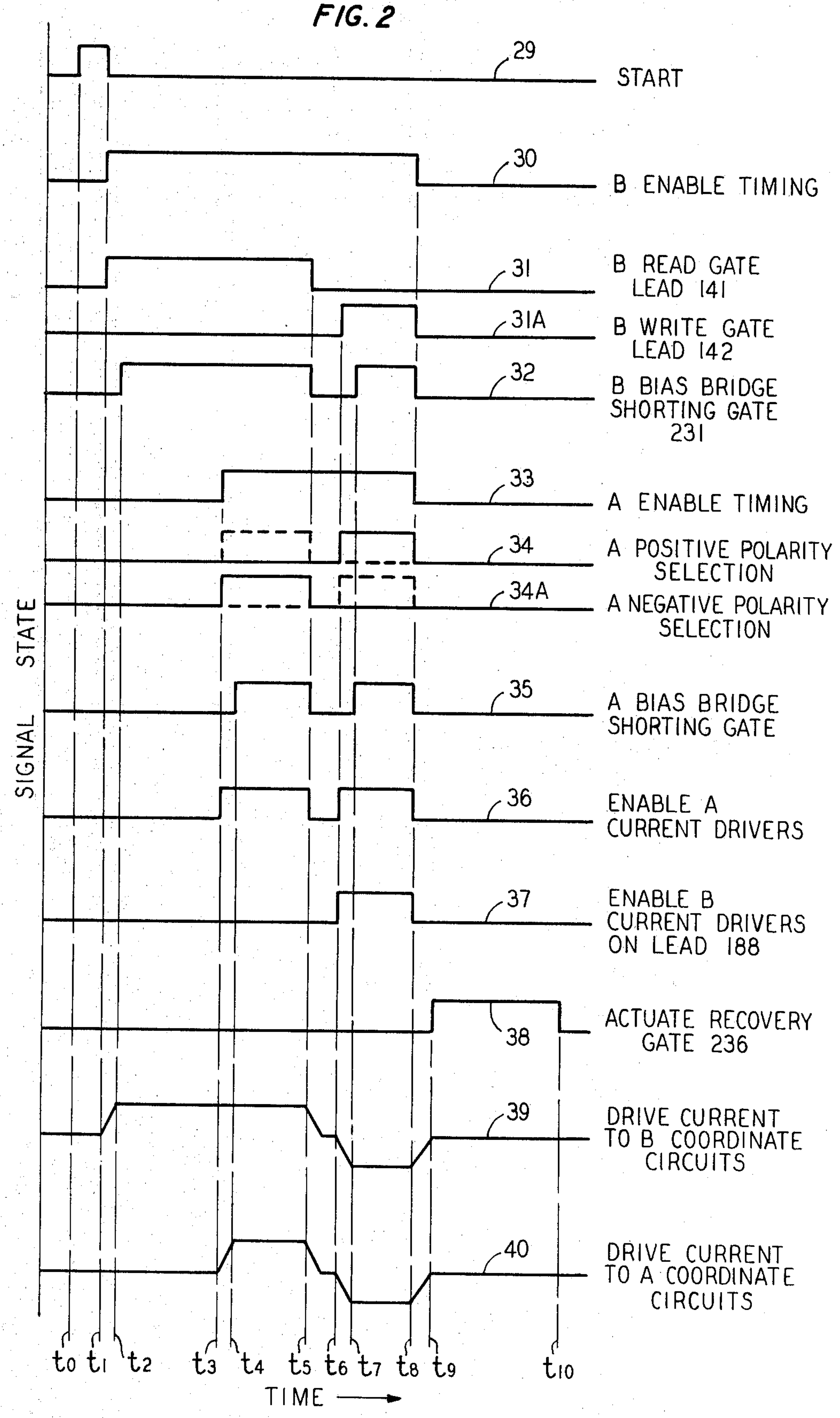
FIG. 2 is a family of timing diagrams illustrating the operation of a memory in accordance with the invention.
Figure 3A:
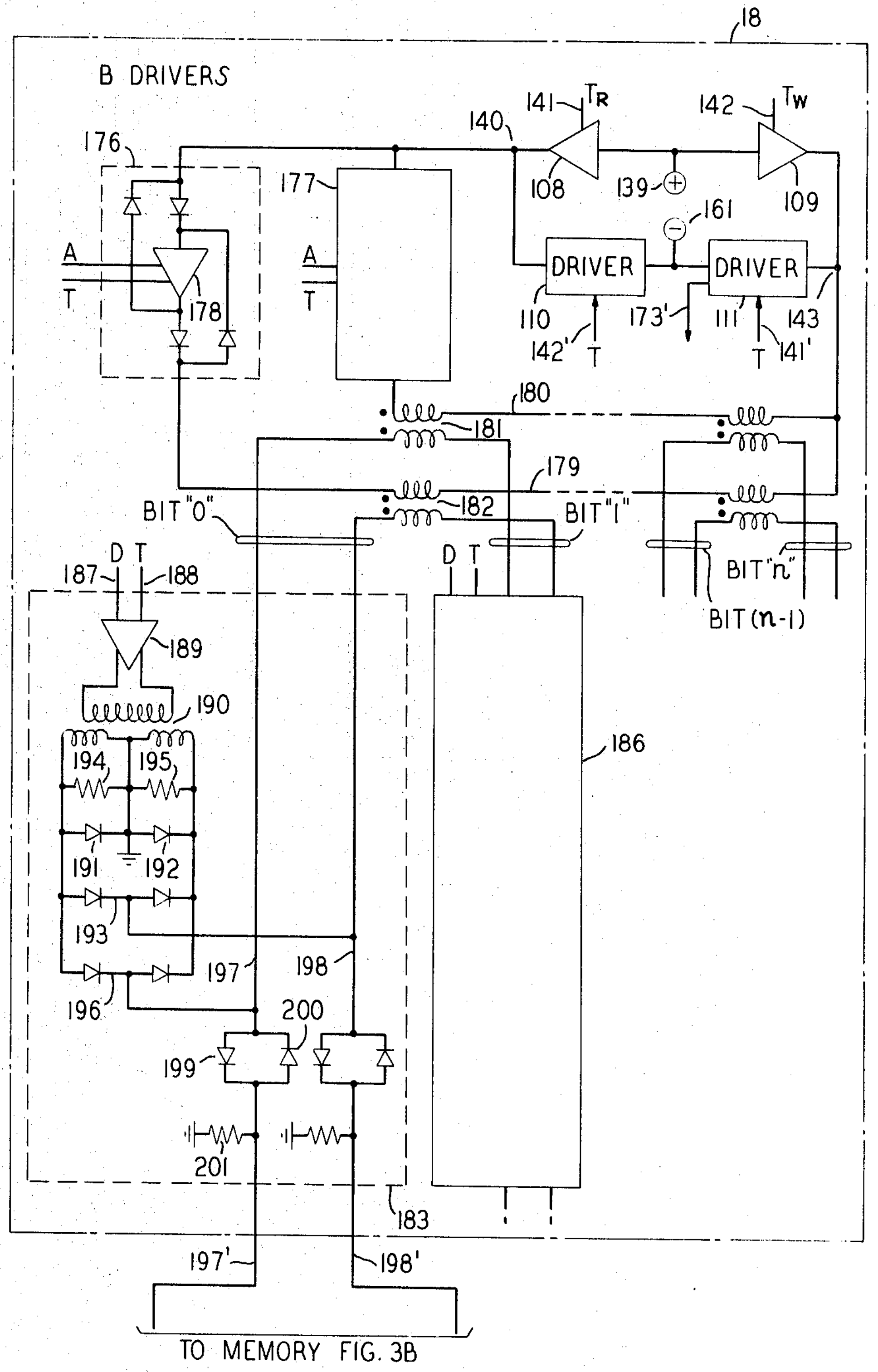
FIGS. 3A, 3B, and 4 comprise partial schematic diagrams of store circuits for implementing the present invention.
Figure 3B:
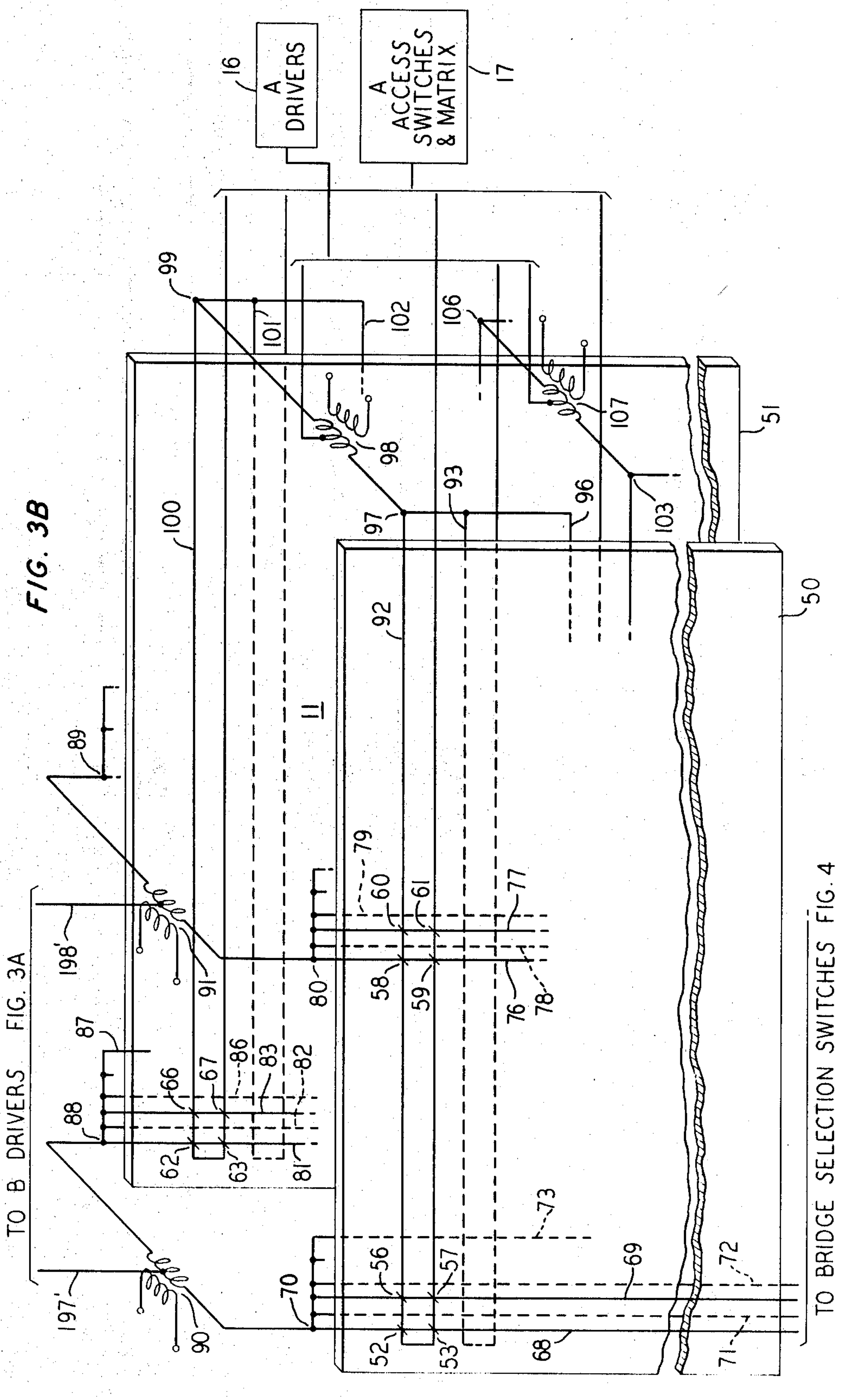
Figure 4:
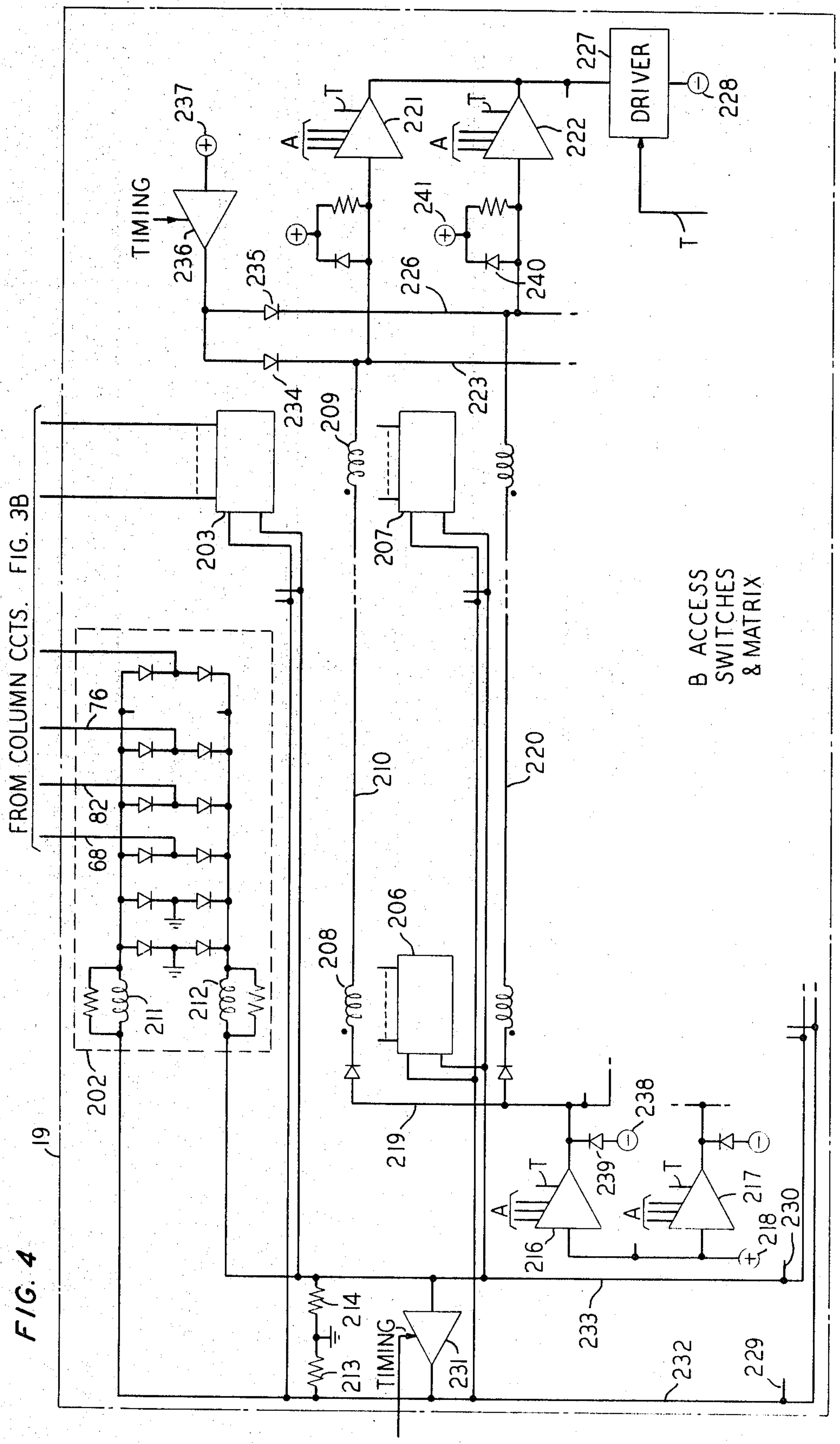

The operation of the processing system of FIG. 1, and of detailed circuits of that system which are included in FIGS. 3A, 3B, and 4, is illustrated by the diagram of FIG. 2. Circuit details of the types well known in the art for performing some functions indicated in FIG. 3 but not essential to an understanding of the invention are omitted. For example, circuits are omitted for providing program-controlled direction of drive polarities but circuits for implementing a direction are shown. FIG. 2 includes a family of waveforms representing a timing diagram of the data processing system. The various waveforms of FIG. 2 will be mentioned from time to time during the description of FIGS. 1, 3A, 3B, and 4. The timing diagram of FIG. 2 represents the normal mode of operation wherein the B circuits are advantageously considered to be the memory bit, or digit, circuits; and the A coordinate circuits are advantageously considered to be the memory word circuits. The search mode of operation is depicted by exactly the same diagram as shown in FIG. 2, but the A and B reference characters on the individual waveform labels are interchanged. Accordingly, the diagram of FIG. 2 is not repeated for the search mode.

Considering first the normal mode of operation of the processing system in FIG. 1, the general method of operation will be indicated by outlining an initial storage operation and one read operation. Then details of a read-write cycle will be reviewed before describing circuit details for implementing the described operations. Control signals from processor 10 are applied to address, mode, and timing circuits 12 to fix the address, mode, and timing functions of store operation in a manner which is well known in the art. Data to be written is supplied by processor 10 to a B data register 20. For the writing operation in the system of FIG. 1, address cables 13 provide various bits of a binary coded address to A drivers 16 and to A access switches and matrix 17 to identify the word, or row, circuit or memory 11 which is to be driven. It will be shown subsequently that each word circuit serves a plurality of memory word locations. Address cables 13 also provide signals to the B drivers 18 and the B access switches and matrix 19 for defining a particular set of column circuits in memory 11 corresponding to the bit circuits of a predetermined group of word locations in memory 11. It will be hereinafter shown in connection with FIGS. 3A, 3B, and 4 that the groups of word locations accessed by the word and bit circuits have only one word location in common. Operation of the addressed one of A drivers 16 and of the B drivers 18 indicated by the data, in response to a timing signal from cables 21, actuates cores at the selected word location on a coincident current basis to store the data from register 20.

During the reading operation of the same word location into which information has been written as just outlined, the address and timing signals are applied on cables 13 and 21 in a fashion similar to that previously described. However, no data signals are present and all B drivers are actuated. The timing signals applied to the drivers reverse the drive polarity for applying resetting drive to all cores in the selected word location of the memory to reset to the binary "0" state any cores that were in the binary "1" state.

Upon the switching of any memory locations which are accessed in the manner just described, the resulting signals induced in the B circuits are coupled through the B access transformers 24 to B detector circuits 27 and from those circuits to the B data register 20. There is no conflict of information in the B data register at this time because all of the B drivers are actuated during the readout operation rather than employing data-responsive selective operation as was the case during the writing interval. A strobe timing circuit 28 is operated during the readout time in response to the A driver operation for strobing the B detectors 27 into operation at a time which is anticipated to be advantageous from a signal-to-noise standpoint, as is well known in the art. This strobe technique advantageously accounts for time variables which may be inherent in the driver operation, but the strobe can also take into account delays from different memory address locations as is also well known in the art. Readout data from register 20 can be either supplied to processor 10, or utilized for further control of the B drivers 18, or both, as may be dictated by program control through processor 10.

A read-write sequence is illustrated in the timing diagram of FIG. 2 and shows details of the order in which circuits of FIG. 1 are operated for a read-write cycle. At time $t_0$ a processor 10 produces a start signal 29 which advantageously initiates operation of address, mode, and timing circuit 12, and the latter circuit determines the subsequent sequence of read-write cycle operation. A reading operation is initiated at time $t_1$ when a B enables timing signal 30 is applied on the timing cables 21 to the B access switches and matrix 19. At the same time a signal 31 is applied to a B read gate to be described in connection with FIG. 3A. The B drive current wave 39 to the column circuits of memory 11 begins to rise at time $t_1$ and thereafter stabilizes at time $t_2$ at a predetermined half-select amplitude as illustrated by the wave 39 in FIG. 2.

At time $t_3$ it is known that the B drive current has been definitely stabilized at its half-select amplitude. This fact is necessary to the operation of the illustrated embodiment since the same B circuits in the memory 11 which are used for conducting the B drive current also serve as memory sensing circuits in the depicted normal mode of operation. Since the drive current is at a stable amplitude level, induced signal variations superimposed thereon as a result of magnetic core switching can be advantageously detected. At time $t_3$ an A enable timing signal 33 in FIG. 2 is applied by the timing cables 21 in FIG. 1 to the A access switches and matrix 17. A polarity selection signal 34 or 34A is applied at the same time to the A drivers 16 for determining the polarity of the A drive signal. Since the A polarity selection partially fixes the address of the selected word location, as is now well known in connection with the so-called 2½D memories, the diagrams 34 and 34A are shown in both solid line and broken line forms to represent the selection of different addresses. Also at the time $t_3$ a further timing signal 36 is applied to enable the A current drivers 16. The combination of the timing signals 33, 34 or 34A, and 36 produces, as a result of the operation of the A drivers 16 and the A access switches and matrix 17, a closed current path for drive current which begins to rise at time $t_3$. Between times $t_3$ and $t_5$ the strobe timing circuit 28 actuates the B detectors 27 as previously described to detect signals induced in the respective memory column circuits by the switching of cores in the memory.

At time $t_5$ the B read gate is disabled by the termination of the first part of the signal 31 to end B drive current 39, and the A drive current termination is similarly initiated by the ending of the A polarity selection signal 34 or 34A and the enable A current drivers timing signal 36. At time $t_5$ the A and B drive currents begin to decrease. At the time $t_6$ the writing portion of the cycle for either writing in new information or regenerating information that has just been read out is initiated. Thus, at time $t_6$ the signal 31A actuates a B write gate, the A polarity selection signal 34 or 34A comes on, and the enable A current drivers signal 36 comes on again. Also at time $t_6$ an enable B current drivers signals 37 is applied to the B drivers 18 for enabling a data responsive B circuit selection. By time $t_7$ the A and B drive currents illustrated by the diagrams 39 and 40 have decreased to their stable negative values, and cores in the selected word location of memory 10 are switched to states for representing data supplied by the B data register 20. At time $t_8$ the B write gate is disabled by the termination of the signal 31A, the A polarity selection signal 34 or 34A is terminated, and the signals 36 and 37 disable the A and B current drivers. At time $t_8$ the A and B drive currents start their positive-going return toward zero as a result of the termination of the B and A enable timing signals 30 and 33 to the respective B and A access switches and matrices. A signal 38 actuates recovery gates, to be discussed, between times $t_9$ and $t_{10}$ to speed the recovery of the A and B matrices from the effects of the write signal.

In the search mode of operation the store system of FIG. 1 operates equally well along either the A or B coordinates, but since the initial description has been started in terms of a word location which extends along the A coordinate with corresponding bits of multiple words lying along the B coordinate, this same assumption will be continued. It is assumed that the words represent the names of circuits (not shown) which are controlled by processor 10 and the status of which is to be searched. Thus, a predetermined bit of each word represents the status of a corresponding circuit. For simplicity of description, it is assumed that only one circuit will be active at a time and that the others will be inactive. However, priority circuits are known in the art and can be readily employed by those skilled in the art to accommodate plural active circuits in some predetermined sequence if more than one of the circuits being monitored is likely to be active at any given time.

In order to carry out an associative search operation, processor 10 directs a readout of the status bits in a column of the memory by causing a readout of that column in a manner which is illustrated by the readout operation of FIG. 2 except that the A and B diagram labels are interchanged. Thus, the A circuits are now driven early at time $t_1$ so that the A drive current can be stabilized to permit the sensing signals to be detected on the A circuits in the presence of the stabilized A drive current when the B drive current is later applied at time $t_3$. The resulting readout from the bit locations along a column of the memory 11 is coupled through the A access transformers 23 to A detectors 42. The A detectors are strobed by a strobe timing circuit 43 that is responsive to operation of B drivers 18. The strobe permits optimum signal-to-noise detection as previously described in connection with the B detectors. The A detector output is coupled over a bus 46 to an A data register 47. At this point, and depending upon the particular type of searching operation that is desired, the status bit readout results from a plurality of word locations and now resting in register 47 can be either restored in their respective locations in memory 11 before the rest of the search mode is continued, or the restoration can be omitted. The option is determined by the particular program being executed. If restoration is desired, processor 10 directs a write operation of the type illustrated in FIG. 2 between times $t_6$ and $t_8$ but with the A and B diagram labels interchanged so that the A drivers 16 are selectively actuated at time $t_6$ in accordance with the status data stored in A data register 47.

The next step in carrying out the search mode of store operation is to use the status information still residing in A data register 47 to read out the memory word location which included the one active bit of the various status bits. To do this a readout operation is initiated and is of the type shown in FIG. 2 except that the A drivers 16 now receive address signals by way of a bus 48 from the A data register 47 rather than from the address cables 13. Thus, only one of the A drivers 16 is actuated, and that one is the driver which corresponds to the active status bit stored in the register 47. A drive current for readout is supplied to the memory word location which included that active status bit. During this readout operation, all of the B drivers are activated as previously described and illustrated in FIG. 2. The coincidence of the A and B drive currents in the selected memory word causes readout of the binary coded information stored therein through the B access transformer 24 and the B detectors 27 to the B data register 20. That word is then further coupled to processor 10 to be utilized for servicing the circuit (not shown) identified thereby.

Although a single-bit search operation has been described, it will be apparent to those skilled in the art that multiple-bit searches are also possible by techniques such as adding more coordinate circuits or segmenting the memory. Similarly, it will be apparent that, although read and write operations related to a full row or column word storage location of the memory 11 have been described, logic circuits are known in the art to permit the actuation of less than all locations along a given coordinate word location by simply disabling a corresponding portion of the drivers of those coordinate circuits during the desired operation. Such disabling can also be accomplished by program control through processor 10.

FIGS. 3A, 3B, and 4, taken together, illustrate the details of one embodiment of memory row and column circuits and associated access circuits for realizing the desired two-way memory function hereinbefore outlined. Address and timing signals from cables 13 and 21 in FIG. 1 are indicated in FIGS. 3A, 3B, and 4 by leads with reference characters "A" and "T," respectively. Similarly, leads designated "D" receive data from the data bus 22 (bus 48 for the A circuits not shown in detail). In FIG. 3B memory 11 is shown in simplified detail with illustrative cores and illustrative row and column circuits. Detailed connections are also shown for access transformers. B drivers 18 are shown in FIG. 3A, and B access switches and matrix 19 are shown in FIG. 4. The A drivers 16 and the A access switches and matrix 17 are all of the same design as the corresponding B circuits.

As the description of FIGS. 3A, 3B, and 4 develops it will be observed that the memory circuits fall into different classification levels depending upon the aspect of operation being considered. For convenience of discussion, these levels are here identified at the outset. All of the circuits are broadly included in one of two "coordinate sets" such as the row, or A, set and the column, or B, set for a system of rectangular coordinates. In information storage parlance, circuits in each of the two coordinate sets are divided by "information position," i.e., word position in the A set and bit position in the B set. Within an information position the circuits are considered by "circuit set," each of which comprises all of the memory circuits connected to one memory access transformer. Finally a "circuit group" comprises the memory circuits of a set which are all connected to the same terminal of an access transformer.

Two hybrid designations for circuits are also employed. A "position couplet" includes circuits of two circuit sets from different information positions but all of which are interconnected through the same selection transformer, to be described. Similarly a "circuit pair" includes two energized circuits of the same circuit set but in different circuit groups thereof.

Memory 11 includes two memory planes 50 and 51 with toroidal magnetic cores arrayed in rectangular coordinates on both the front and the back faces of those planes thereby forming core biplanes. In order to preserve drawing simplicity and thereby facilitate an understanding of the invention, only twelve cores are shown in FIG. 3; and they are represented by short diagonal lines at the intersections of row and column circuits. The cores 52, 53, 56, 57, 58, 59, 60, and 61 are on the front face of plane 50, and cores 62, 63, 66, and 67 are on the front face of plane 51. A complete rectangular array for the front face of plane 50 and the front face of plane 51 are, of course, provided along with an identical array on the back face of each of those planes. All of the cores of both planes 50 and 51 are uniformly oriented in the manner illustrated. That is, the plane of each core, i.e., the plane including intersecting core diameters, is perpendicular to its corresponding one of the planes 50 and 51 and the planes of all the cores extend from the lower left to the upper right as viewed in FIG. 3B. This type of core orientation permits circuits to be threaded straight through either a row or a column of cores, and it also permits the cores to be relatively easily assembled in their respective planes as compared to core arrangements in which alternate cores are oriented at 90 degrees with respect to one another along at least one memory coordinate, as is common in the prior art. Furthermore, the uniform orientation permits more compact arrays than are possible with differently oriented cores because uniformly oriented cores are advantageously overlapped. The overlapping is not shown because it complicates the drawing, but the coordinate lines of cores are more closely spaced to produce the overlapping and still leave adequate room for lacing wires through the cores.

The specific arrangement of memory row and column circuits to be described in connection with FIG. 3B is only one of a number of possible implementations and others will be readily apparent to those skilled in the art after a description of the underlying principles involved in the particular embodiment illustrated. All row and column circuits of memory 11 are balanced to permit the application of longitudinal mode drive current along two sides of a parallel connection of circuits of a balanced arrangement and to permit the conduction of induced signals in a metallic loop circuit formed by such a parallel connection of circuits. The longiutdinal current has a return path through ground or another column circuit selection with a comparatively low ratio of access-a sense conjugate because they do not directly affect one another. Individual circuits in balanced circuit combinations are multipled in plural groups along the two sets of memory coordinates, i.e., along the row and column sets of coordinates, respectively. Such grouping facilitates the circuit selection with a comparatively low ratio of accessing hardware to memory circuit accessed. It also permits relatively short memory coordinate circuits, thereby minimizing transmission line effects along such circuits.

All column circuits in memory 11 are laced straight through single columns of cores, and all row circuits are looped through two rows of cores so that each row circuit has two core linkages with each column circuit in the same face of the same plane. Polarity control of either the row or column current determines which of the two cores in such common linkage is to be switched at the time of a coincident drive current application. Two column circuits 68 and 69 are shown in a first group of circuits on the front of plane 50 and they have their upper ends connected to a terminal 70. Similarly, additional column circuits 71, 72, and 73 on the back side of plane 50 also have their upper ends connected to the common terminal 70. In like manner, column circuits 76, 77, 78 and 79 in the front and rear faces of plane 50 have their upper ends connected to a common terminal 80; and column circuits 81, 82, 83, 86, and 87 in the front and back faces of plane 51 have their upper ends connected to a common terminal 88. A further grouping in plane 51 is schematically indicated at a terminal 89. Other column circuits, not shown, in the memory 11 are similarly grouped with their upper ends connected to a common terminal for each group.

Common terminals of corresponding column circuit groups of the planes 50 and 51 are connected together through a center tapped primary winding of one of the B access transformers. Thus, in FIG. 3B terminals 70 and 88 are connected together by the center tapped primary winding of a transformer 90, and terminals 80 and 89 are similarly connected together by a center tapped primary winding of a transformer 91. Other column circuit groups (not shown) of the two planes are similarly connected together. Pairs of individual column circuits which have their upper ends connected together through an access transformer primary winding, as just described, have their lower ends arranged to be connectable together through the B access switches and matrix 19, which will be described in connection with FIG. 4.

The column circuits of corresponding groups which are connected to opposite sides of a primary winding of an access transformer are further arranged in different column circuit pairs. Each such column circuit pair forms a loop circuit so that (a) signals induced by the switching of a core to which either column circuit of a pair is coupled are conducted around the loop in a metallic circuit and are coupled through the access transformer to its secondary winding and from that winding to the B detectors 27; and (b) signals applied to drive a core to which the circuit of a column circuit pair is coupled are conducted in a longitudinal sense down both sides of the loop and couple no significant net signal to the access transformer secondary winding.

In FIG. 3B the various column circuits in planes 50 and 51, which are connected as aforesaid to transformers 90 and 91, all represent the bit "0" location of various words in memory 11. Transformers 90 and 91 are never simultaneously energized; and B access switches and matrix 19 are organized, as will be described, so that only one column circuit pair coupled to any one access transformer can be energized. Other column circuit groups not shown and associate with planes 50 and 51 are similarly interconnected by pairs of access transformers and by B access switches and matrix 19 for additional bit locations. It will be seen that this type of memory organization and access permits access to many different memory word locations with relatively short bit circuits because a part of the word location selection is performed as an inherent part of the bit location selection. Thus, when a column circuit pair is selected for energization, the functions of (a) selecting one of two column circuit access transformer paths at each bit position, (b) selecting column circuit current polarity, and (c) selecting a column circuit pair at each bit position, all contribute to the definition of a memory word location. Before describing the B drivers and the B access switches and matrix, the memory row circuit arrangement with respect to the column circuits will be described to show how the 2½D-type of memory operation is used to avoid double selections.

The different row circuit loops of the memory are arranged to link rows of cores on the fronts and backs of the planes 50 and 51 in much the same fashion that the column circuits link cores on the fronts and backs of planes 50 and 51. Both row circuit portions of any row circuit loop link cores on the same side of a plane. One end of each row circuit loop in a group is connected to a common terminal and then through an access transformer primary winding to a common terminal of a corresponding row loop circuit group of the other plane. Thus, row circuits 92, 93, and 96 have one end connected to a common terminal 97 which is connected through the primary winding of an A access transformer 98 to a common terminal 99 of a row circuit group including circuits 100, 101, and 102. Only a relatively few column circuits are shown in each group to preserve drawing clarity. Other row circuits of the two memory planes are similarly grouped for connection through common terminals 103 and 106 and A access transformer 107. Additional row circuit groups (not shown) are also coupled through access transformer primary winding pairs as just described for the access transformer pair 98 and 107.

Center taps of primary windings on transformers 98 and 107, and other A access transformers not shown, are connected to A drivers 16 which are the same as the B drivers 18 to be described. The opposite ends of each of the row circuit loops are interconnected in loop pairs through A access switches and matrix 17 to form overall row circuit loops of paired row circuit loops. For example, row circuit 92 extends across its plane from terminal 97 to core 52 and is looped back to access switches and matrix 17. Row circuit 100 is similarly looped in its plane, and the two row loop circuits 92 and 100 are advantageously paired through transformer 98 and circuit 17 to form an overall row circuit loop. Such an overall row circuit loop receives drive current in a longitudinal sense through the center tap of transformer 98 and provides sensing current metallic loop paths as already described in connection with the memory column circuits, around the overall loop circuit. As in the case of the column circuits, word drive current to a selected row location drives only one pair of word loops for that location and that current returns to drivers 16 through a row loop pair of a different row location or through ground in the same fashion which will be described for the column circuits.

There is, however, a rule of intersection which governs the way in which the row and column circuits are applied to memory planes 50 and 51. Thus, a circuit of any energized circuit pair along one row or column coordinate set can have a common core linkage with only one circuit of any one energized pair along the other coordinate set. By way of example, in FIG. 3B column circuits on the front of plane 50 are paired with corresponding circuits on the back of plane 51, and column circuits on the back of plane 50 are paired with column circuits on the front of plane 51. Consequently, and in order to comply with the aforementioned rule of intersection, row circuit loops on the front of plane 50 are paired with row circuit loops on the front of plane 51, and row circuit loops on the back of plane 50 are paired with row circuit loops on the back of plane 51. Thus, if it is desired to switch core 52, column circuit 68 would be energized along with the corresponding column circuit 82 of the same pair. Likewise, the row circuit pair including the row circuit loops 92 and 100 would also be energized. Since the row circuit 100 is in the front of plane 51 and the column circuit 82 is on the back of plane 51, there is no coincident drive to cores of plane 51. In plane 50 column circuit 68 and row circuit 92 have common linkage in cores 52 and 53; and, in order to switch core 52, row and column circuit current polarities must be selected so that the corresponding currents link core 52 in the same sense.

The B drivers 18 will now be described in connection with FIG. 3A. A pair of switch gates 108 and 109 and a pair of driver circuits 110 and 111 supply drive current of read or write polarity as controlled by timing and program information from processor 10 in FIG. 1. It must be understood, however, that the so-called read and write polarities may not be necessarily restricted to reading or writing operations, respectively, since polarity reversals are also used for partially defining memory locations to be accessed, as is known in connection with the 2½D type of memory. A switching gate of the type which is useful for gates 108 and 109 is illustrated in FIG. 5.

Figure 5:
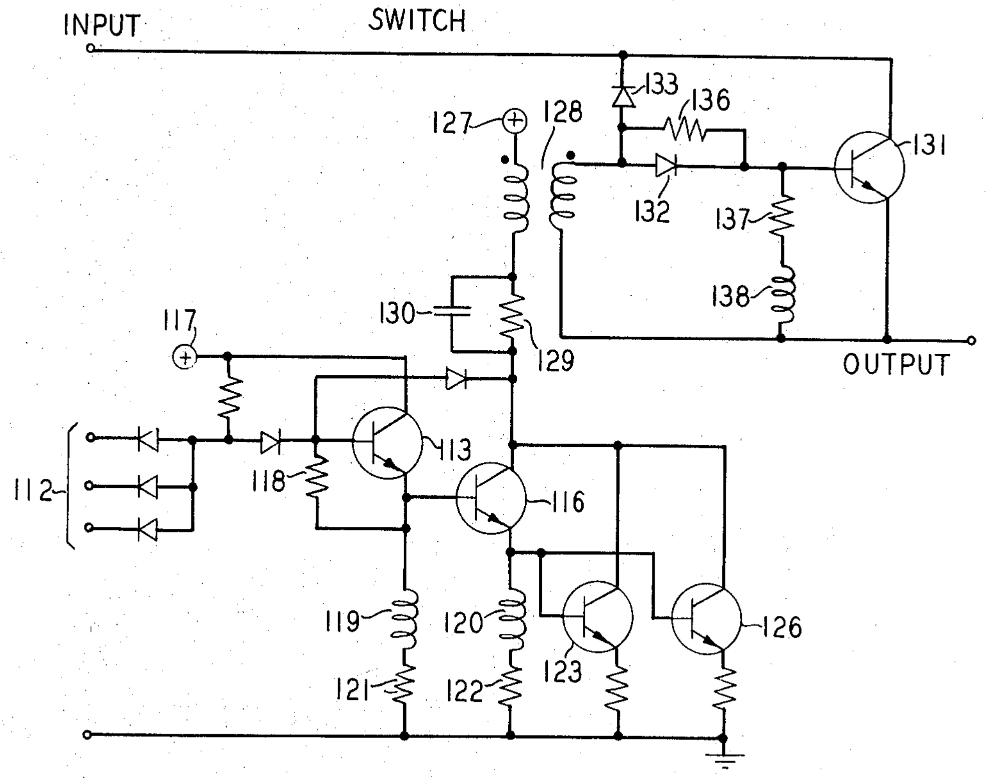
FIGS. 5 and 6 are schematic diagrams of a switch and a current driver, respectively, that are useful in the circuits of FIGS. 3 and 4.

The circuit of FIG. 5 represents one switching gate which is advantageously employed in the present invention although there are other forms of gates which can produce the desired switching effect in a series path. Input connections 112 are provided for coupling input signals with respect to ground to a resistor-diode coincidence gate for controlling the application of current to the base electrode of a transistor 113. An antisaturation diode interconnects that base electrode and the collector electrode of a transistor 116. One or more of the coincidence input connections can be employed, and in the gates of FIG. 3A only one is employed for each of the gates 108 and 109.

Transistors 113 and 116 are connected in an emitter follower arrangement wherein transistor 113 receives collector current from a source 117. That source is schematically represented by a circled plus sign to indicate connection of a positive terminal of a potential source which has its negative terminal connected to ground. Similar source representations with appropriate polarity signs are included throughout the drawings. A resistor 118 develops a specific forward bias potential for the base-emitter junction of transistor 113 so that both transistors 113 and 116 are driven into heavy conduction when the coincident inputs direct that base current should be applied to transistor 113. Coils 119 and 120 are connected in series with resistors 121 and 122 in the emitter circuits of transistors 113 and 116, respectively. These coils perform a pulse shaping function to help realize a sharp leading edge of the gate output signal.

Transistor 16 operates in a Darlington arrangement with a pair of parallel-connected transistors 123 and 126. Collector current is supplied by a positive source 127 through the primary winding of a transformer 128 in series with a parallel combination of a resistor 129 and a capacitor 130. That resistor and capacitor cooperate further to produce a sharp leading edge on the output pulse and limit the current to a safe maximum. The secondary winding of transformer 128 is applied across the base-emitter junction of a final switch transistor 131 through a coupling and antisaturation diode 132 and is further connected to the collector electrode of the same transistor through an antisaturation diode 133. A resistor 136 bypasses diode 132 to facilitate recovery of transformer 128 after each pulse. A resistor 137 and a coil 138 connected in series across the base-emitter junction of transistor 131 also cooperate in the output pulse rise time and fall time shaping functions.

Relating the gates 108 and 109 of FIG. 3A to the circuit of FIG. 5, a positive potential source 139 in FIG. 3A supplies input current to the collector electrode of transistor 131, and that same current appears in the gate output at a terminal 140 in FIG. 3A. An input timing pulse is applied to a lead 141, which corresponds to a coincidence input 112 of the gate in FIG. 5, for producing the read polarity drive current. Similarly, the gate 109 responds to a write input timing signal on a coincidence input 142 for coupling current from the source 139 to a gate output terminal 143.

The signals on read and write leads 141 and 142 in FIG. 3A are the timing signals 31 and 31A in FIG. 2 when the B drivers are operating in the normal mode as digit circuits. Signal 31 is then applied to lead 141 at times $t_1$–$t_5$ to read and signal 31A to lead 142 at times $t_6$–$t_8$ to write. If the B drivers are operated in the word circuit mode, e.g., as are the A circuits in the present description, the leads 141 and 142 are changed, by logic circuits not shown, to be controlled by address, mode, and timing circuit 12 so that driver current polarity selection is made in accordance with address signals to define which of the two cores coupled in common to a selected row and column circuit should be actuated. In the latter mode the selected one of the leads 141 and 142 receives the $t_3$–$t_5$ portion of one of the signals 34 or 34A, instead of a portion of the signal 31, to read; and the other lead thereafter receives the $t_6$–$t_8$ part of the other one of signals 34 or 34A to write.

Figure 6:
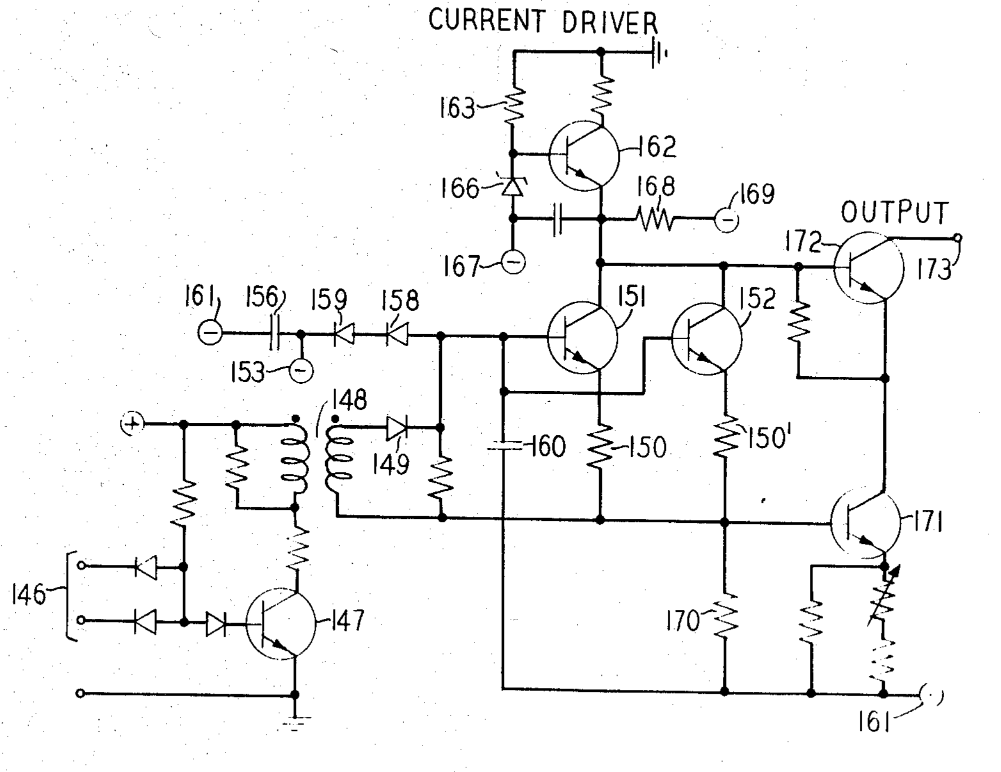

Drive circuits 110 and 111 of FIG. 3A are advantageously implemented in the form illustrated in FIG. 6 to operate as a current source for providing a temperature compensated current level.

In FIG. 6 coincidence inputs 146 drive a transistor 147 into saturated conduction for energizing a primary winding of a coupling transformer 148. The secondary winding of that transformer is coupled through a diode 149 to the base electrodes of transistors 151 and 152 for turning on the transistors. Resistors 150 and 150' connect the same winding to emitter electrodes of the transistors. The transistor 151 is arranged with transistor 152 for operation as an emitter-follower circuit. A negative reference source 153 is positive with respect to a further source 161 shown on both sides of FIG. 6. A capacitor 156 provides a low impedance path for alternating current between sources 153 and 161. The right-hand terminal of the capacitor is coupled through a pair of series-connected diodes 158 and 159 to the base electrodes of transistors 151 and 152. Those diodes are poled for conduction away from the transistor base electrodes and thereby assure that the base electrodes do not go more positive than a level dictated by source 153. A pulse from transformer 148 drives the transistors 151 and 152 into conduction, and current through their common emitter circuit resistor 170 develops a bias for turning on a transistor 171. The latter transistor completes a conduction path for a transistor 172. A capacitor 160 coupled between the source 161 and the base electrodes of transistors 151 and 152 fixes the rise time of current at output terminal 173.

Collector current for transistors 151 and 152 is supplied through a transistor 162 which is held at a predetermined conduction level by the operation of a potential divider including a resistor 163 which is connected in series with a breakdown diode 166 across a negative source 167. The emitter electrode of transistor 162 is also connected through a resistor 168 to another negative source 169. Transistor 162 and its associated circuits hold transistor 172 in readiness for conduction whenever transistors 151 and 152 turn on transistors 171.

In FIG. 3A the driver 110 corresponds to the circuit of FIG. 6. The coincidence gate portion including transistor 147 of FIG. 6 receives a single input timing lead 142' corresponding to the write timing lead 142 on gate 109. Output terminal 173 in FIG. 6 corresponds to the terminal 140 in FIG. 3. Driver 111 in FIG. 3 similarly corresponds to the circuit of FIG. 6 and receives read timing on an input connection 141'. Driver 111 also has an additional output connection 173' for sending a control signal to the strobe timing circuit 43 in FIG. 1.

In FIG. 3A leads 141 and 142 are energized in the alternative by timing signals from the cable 21 in FIG. 1. These signals enable gate 108 and driver 111 for read polarity current and gate 109 and driver 110 for write polarity current. At the same time that one of these gates is selected an address bit on the address cables 13 acetuates one or the other of two bipolar gates 176 and 177. Those gates are of the same type so only one is shown in detail. Each of these gates includes a switch gate 178 of the type shown in FIG. 5 for providing a through current path across the diagonal of a diode bridge in a well known manner. Coincident address and timing input signals determine which gate will operate and at what times. If the address signal bit is in one binary state, gate 176 is operated at read or write time to pass drive current of either polarity; and, if the address bit is in the other binary state, gate 177 is similarly actuated to pass drive current of either polarity. Each of the gates 176 and 177 is connected in series with a different string 179 or 180 of transformer primary windings between terminals 140 and 143.

Read polarity drive current is supplied to the transformer primary winding string 180 when timing signals actuate gate 108 and driver 111, and address and timing signals actuate gate 177. Current then flows from source 139 through gate 108, terminal 140, gate 177, primary winding string 180, terminal 143, and driver 111, to source 161. Write polarity current is provided in the same transformer winding string by actuating gate 109 and driver circuit 110 instead of gate 108 and driver 111. Either of the aforementioned currents is applied to the primary winding string 179 instead of 180 by having the address signals actuate gate 176 instead of gate 177.

Each of the primary winding strings 179 and 180 includes a transformer primary winding for every two bit positions of a word in memory 11. The secondary winding of each transformer is connected between center taps of access transformer primary windings for a couplet of adjacent memory bit positions. Thus, a selection transformer 181 has its secondary winding connected between the primary winding center tap of FIG. 3B transformer 90 in bit position "0" and the center tap of a corresponding access transformer primary winding (not shown) in bit position "1." Similarly, the secondary winding of a corresponding transformer selection 182 in the string 179 interconnects the center tap of the primary winding of FIG. 3B transformer 91 to a corresponding circuit point in bit position "1."

It can now be seen in bit position "0," for example, that the actuation of one or the other of the gates 176 and 177 energizes a corresponding one only of the selection transformers 181 and 182 for similarly energizing one only of the B access transformers 90 and 91.

When any one of the transformers such as 181 or 182 is energized, the voltage difference developed across its secondary winding drives a current through one pair of column circuits in memory 11 to the B access switches and matrix 19, and that current returns to the secondary winding of the same transformer by flowing in opposite direction through a pair of column windings in the adjacent bit position of the memory. The same type of operation occurs for all bit location pairs of the memory. Corresponding cores in the two bit locations for the same word would necessarily be on opposite sides of their common row loop circuit because the selected row and column currents may link only one core at each bit location in aiding sense. Thus, when all bit locations are to be driven as, for example, for reading out of a word in memory 11, cores of the adjacent bit positions in a bit position couplet in that word are driven in opposite senses.

The B driver circuits as described up to this point can apply current of either polarity to all bit locations of a selected word in memory 11 at the same time. In order to provide bit selection capability for supplying drive current only to selected column circuits of a given memory word, column nonselection circuits such as the circuits 183 and 186 are included at each bit position in the drivers 18 between the transformer strings and the access transformers. Details of the circuit 183 are shown in FIG. 3A and the circuit 186 and other corresponding circuits (not shown) are the same. The purpose of the column nonselection circuit is to provide a by-pass path around the column circuits in a given bit position of the memory without disturbing current which may be required in column circuits of an adjacent bit position of the same bit position couplet. For this purpose, data is provided on a lead 187 which is arranged, by circuits not shown, for receiving either a signal from the data bus 22 or a signal from the address cables 13 to direct that column circuits of a certain bit position, e.g., bit "0" in FIG. 3A, are nonselected circuits and are to be by-passed.

Timing signals from the cable 21 in FIG. 1 are applied to a lead 188 in FIG. 3A. When the B drivers 18 are operating in the digit circuit mode as decribed herein, the mentioned timing signal is the enable B current drivers signal 37 in FIG. 2. Such signal is needed only during times $t_6$–$t_8$ of the writing interval because during reading times all of the B drivers 18 are actuated for reading the various bit locations of a selected word. When the B drivers are operating in the word circuit mode, as are the A circuits herein, the timing signal 36, instead of 37, is used during both the reading times $t_3$–$t_5$ and the writing times $t_6$–$t_8$. It is necessary at both reading and writing times because the drivers in the word mode must receive either data or address at both times so that only one word location in memory will be selected, i.e., word circuits to other word locations are short circuited by nonselection circuits corresponding to circuits 183 and 186.

Program selects either data signals from bus 22 or address signals from cable 13 and applies the selected signals to lead 187 in coincidence with the timing signals on lead 188 to activate a gate 189. The latter gate is of the type represented by the circuits of transistors 113, 116, 123, and 126 in FIG. 5. The gate output develops a signal across a transformer 190 which has a center tapped secondary winding of transformer that otherwise corresponds to the secondary winding 128 of FIG. 5. Two diodes 191 and 192 are connected in series across the secondary winding of transformer 190, and two damping resistors 194 and 195 are also connected in series across the same secondary winding. These diodes are biased for forward conduction by the signal from transformer 190. The diodes and resistors have their respective common intermediate circuit terminals connected to ground along with the winding center tap. Additional diode branch circuits 193 and 196 are also connected across the secondary winding of transformer 190, and they have their respective intermediate terminals connected to column drive circuits 197 and 198. The mentioned transformer and diode circuits comprise a multiarm diode bridge switch of the type disclosed and claimed in the copending application of R. M. Genke, P. A. Harding and M. W. Rolund, Ser. No. 576,056, filed Aug. 30, 1966, entitled "Bidirectional Switch for Multiple Circuit Control" now Pat. 3,492,651.

The signal produced from transformer 190 biases all of the connected switch diodes into conduction and thereby effectively grounds column drive circuits 197 and 198. It will be seen from the subsequent description of the B access switches and matrix 19 in connection with FIG. 4 that those circuits also provide ground connections for the column circuits by means of similar multiarm diode bridge switches. Thus for example, if the upper transformer string 180 is selected to be driven for providing current to bit "1" but not to bit "0," the column nonselection circuit 183 is activated by data and timing signals for grounding column drive circuits 197 and 198. In that state the current from transformer 181 passes through circuit 197 to ground between diodes 191 and 192 and from ground through the B access switches and matrix 19 back through a bit "1" column circuit and column nonselection circuit 186 to the transformer 181.

Each of the column drive circuits such as 197 and 198 includes in series a pair of oppositely poled parallel-connected diodes 199 and 200 with the lower terminal of the diode pair connected to ground by a resistor 201. The column drive circuit portions 197′ and 198′ extend to the center taps of the corresponding B access transformer primary windings. Thus when circuit 197 is connected to ground at the upper terminals of diodes 199 and 200 to by-pass the memory column circuits, the resistor 201 places the opposite terminals of diodes 199 and 200 at ground so that such diodes have neither a forward nor a reverse bias. In that state the diodes represent a high impedance to current flow for blocking a sneak current path through the corresponding memory column circuit. Thus, a column nonselection circuit, e.g., circuit 183, is activated to designate a nonselected column circuit of the memory. The resistance of resistor 201 is much higher than the resistance of its corresponding memory column circuits so that it does not by-pass a significant amount of current to ground when one of those column circuits is selected to be energized.

FIG. 4 shows the B access switches and matrix 19 for the column circuits of memory 11 in FIG. 3. However, the same type of circuit is employed for the corresponding circuits 17 in connection with the row drive function of the memory. Memory column circuits are connected to different diode arms of various multiarm bridge switches such as the four switches 202, 203, 206, and 207 shown in FIG. 4. Many other bridge switches are employed in the circuit 19 of FIG. 4, but only a few need be shown to illustrate the manner of connection and cooperation thereof. The switches in FIG. 4 are all of the same type, and that is the type shown in the aforementioned Genke et al. application. Accordingly only switch 202 is shown in detail in FIG. 4.

The switch 202 accommodates one portion of the column circuits of memory 11 and such circuits include corresponding column circuit pairs on both B access transformers of plural bit locations. Thus, the switch 202 has different diode arms connected to the column circuits 68 and 82 of FIG. 3B which comprise one pair of such column circuits that are connected to transformer 90. Another diode branch of switch 202 similarly accommodates a corresponding column circuit pair including the circuit 76 connected to transformer 91 in bit position "0." The same switch also accommodates similar column circuit pairs of both transformers of other bit positions in the memory, but no more than one column circuit pair of a single access transformer is connected to a single bridge switch. Column circuit pairs from four bit positions are advantageously controlled by each of the switches such as the switch 202, and six such switches are then employed to accommodate the column circuit pairs for four words of a memory with 24-bit words.

Each group of six switches, which thus accommodates four 24-bit words, is inductively coupled to be a single crosspoint load of a selection matrix arrangement of a type which is also shown in the aforementioned Genke et al. application. Thus, in FIG. 4 transformer primary windings 208 and 209 comprise two windings of six transformer primary windings which are connected in series in a string 210 of such windings. The primary winding 208 is inductively coupled to a pair of secondary windings 211 and 212 in the switch 202, and each other primary winding in the string is similarly connected to a pair of secondary windings in a corresponding one of the switches such as switch 203 and other switches not shown. The secondary windings 211 and 212 are interconnected through a series combination of resistors 213 and 214 which have their common intermediate terminal connected to ground.

The secondary winding 211, 212 connection is somewhat modified from that shown for the same type of switch in the column selection circuit 183 of FIG. 3A. The arrangement of the resistors in series between two secondary windings in FIG. 4 causes bias current induced in those secondary windings, and in fact in all secondary windings associated with primary windings in the same string 210, to develop a potential difference across the resistors 213 and 214. That potential difference is of appropriate polarity for reversely biasing diode branches in other switches such as the switch 206 and the switch 207, thereby preventing spurious breakdown of those diodes. A corresponding reduction is realized in the opportunity for sneak current paths through nonselected diode switches and column circuits.

Matrix switches, such as two switches 216 and 217 in FIG. 4, are of the type shown in FIG. 5 and are actuated by the coincidence of a B enable timing signal 30 from cable 21 of FIG. 1 and address signal bits on the address cable 13 in FIG. 1. (Corresponding switches in A access switches and matrix 17 receive the A enable timing signal 33.) Only one of such matrix switches at the left of FIG. 4 is actuated. When a switch such as the switch 216 is actuated, it provides a current path from a positive source 218 through the switch 216 to a matrix rail 219 where such current is available to various crosspoint load transformer primary winding strings such as the strings 210 and 220. At the same time address and timing signals also actuate one of a further group of matrix switches including switches 221 and 222 at the right-hand side of FIG. 4 for coupling the aforementioned current path through one of the rails 223 or 226 to a driver circuit 227 and a negative source 228. Thus, the address-controlled actuation of matrix switches causes only one of a plurality of transformer winding strings to be energized, thereby activating only the one six-switch group of diode switches such as the group including switches 202 and 203. If matrix switch 221 is activated, current flows through the primary winding string 210 and switch 221 to the driver 227. Similarly if matrix switch 222 is selected, the current flows from switch 216 through primary winding string 220 and the switch 222 to the driver 227.

Driver 227 is a circuit of the type shown in FIG. 6, and it employs a coincidence input connection for timing signals as indicated in FIG. 4. Many other matrix primary winding strings are advantageously employed in addition to the two actually shown, but are not shown in FIG. 4 since they are not necessary to an understanding of the operation of the invention. Such additional matrix and switch circuits are schematically represented in FIG. 4 by broken-line connections such as in the winding string 220 and short diagonal lines representing multiple connections such as the diagonal lines 229 and 230 on bus connections 232 and 233.

A bridge shorting switch 231 is included between bridge bus connections 232 and 233 for short-circuiting resistors 213 and 214 in response to timing signal 32 of FIG. 2. (A corresponding shorting switch in A access switches and matrix 17 is actuated by signal 35.) The purpose of this shorting switch, which is of the type shown in FIG. 5 and which is activated at the end of a drive pulse rise time, is to reduce the need for a large primary winding voltage at primary windings such as the winding 208 after the column drive current has stabilized at its drive magnitude. When such stabilization has taken place, the column circuit potential difference drops, as is well known in the art; and there is less chance of the potential difference developed across a selected column circuit being adequate to turn on spuriously any of the diode selection switches in the B access switches and matrix. Accordingly, operation of B bias bridge shorting gate 231 reduces the transformer secondary circuit voltage. Since the time of high transformer voltage is reduced, there is less chance of the core saturating, and the overall memory can operate with a more advantageous duty cycle.

All of the diode bridge switches in FIG. 4 are actually connected in multiple with one another so that a single set of the resistors 213 and 214 can supply the necessary reverse bias to hold off nonselected switches. However, it has been found advantageous to employ a number of sets of such resistors and associated shorting gates distributed along bus connections 232 and 233. This makes a short current path to the appropriate biasing resistors and low impedance paths for the connection between switch transformer secondary windings during relatively steady operation. Consequently, the reliability of switch operation is correspondingly improved.

Timing wave 38 in FIG. 2 is a signal for actuating a switch 236 in FIG. 4 after drive current termination to operate fast recovery circuits for the crosspoints of the matrix in FIG. 4. The switch 236 couples the output of a positive source 237 through steering diodes 234 and 235 to the matrix rails 223 and 226 for supplying current to the matrix crosspoint primary windings for reversing the polarity of charge remaining on transformer stray capacitances and thereby speeding transformer recovery.

A further source, such as the negative source 238, is connected through a diode 239 for supplying current to recover the inductance of the crosspoint primary windings rapidly. Thus, when the matrix switches such as the switch 216 open at the end of a drive operation, the voltage across primary windings in the selected matrix crosspoint reverses, as is well known in the art, to maintain the former current flow polarity therethrough. This voltage prevails as the current decreases toward zero for recovery. If winding string 220 had been conducting, current from source 238 flows through its diode 239, the selected matrix crosspoint load string 220, and a corresponding diode 240 and positive source 241. If such arrangements were not made for transformer recovery, the inductive kick upon matrix switch turn-off could easily break down the switch transistors and would also build up flux bias in the transformer cores.

Growability is a common need in data processing systems and their associated stores. The illustrated embodiment of the present invention has growability. For example, groups of row or column circuits can be enlarged by appropriately enlarging the capacity of the access switches and matrix circuits. Such a change permits more storage locations to be employed without changing the corresponding drivers. Similarly, it is possible to add similar pairs of memory planes operating on the same access transformers by using a rule of intersection of the type presented herein to prevent double selection of memory locations.

Although the present invention has been described in connection with a particular embodiment thereof, it is to be understood that additional embodiments and modifications which will be apparent to those skilled in the art are included within the spirit and scope of the invention.

What is claimed is:

1. In combination, a memory having a plurality of storage elements arrayed along predetermined sets of coordinates, each of said elements having plural states to which it can be actuated to store information, a first plurality of circuits linking said elements along a first one of said sets of coordinates, a second plurality of circuits linking said elements along a second one of said sets of coordinates, and means energizing at least two circuits of said first plurality and at least two circuits of said second plurality for actuating selected ones of said elements, each energized circuit of either of said pluralities linking storage elements in common with a maximum of one energized circuit of the other of said pluralities.

2. The combination in accordance with claim 1 in which each energized circuit within either of said pluralities has approximately the same level of energization as other energized circuits in the same plurality of circuits.

3. The combination in accordance with claim 1 in which storage elements linked in common by circuits of both of said pluralities comprise a common linkage, each said common linkage comprises two of said storage elements, and each of said two elements is linked in the same sense by a circuit of said first plurality and in different senses by a circuit of said second plurality.

4. The combination in accordance with claim 1 in which the storage elements are magnetic cores each having plural remanent magnetic flux states to which it can be selectively switched to store information, said energizing means comprises first means interconnecting said first plurality of circuits in different circuit sets for providing at least one pair of longitudinal current paths in each set and for providing a metallic loop current path in each such pair of current paths, and said energizing means further comprises second means interconnecting said second plurality of circuits in different circuit sets for providing at least one pair of longitudinal current paths in each set and for providing a metallic loop current path in each such pair of current paths.

5. The combination in accordance with claim 4 in which said first and second interconnecting means each comprises means extending along a third set of coordinates and electrically connecting plural groups of circuits of the same one of said sets of coordinates to form one of said circuit sets.

6. The combination in accordance with claim 4 in which said cores are all oriented in the same direction.

7. The combination in accordance with claim 4 in which said cores are arranged on at least first and second planes, on both front and back faces of each of such planes and in rows and columns corresponding to said sets of coordinates, respectively, said first and second pluralities of circuits linking cores in said rows and columns, respectively, each of said row and column circuit sets includes circuits linking cores on different ones of said faces, and control means energize said row and column circuits sets so that each said row and column circuit set includes only one energized row circuit in the same face of a plane as an energized column circuit.

8. The combination in accordance with claim 7 in which said column circuits link in the same sense all cores to which they are coupled, and said row circuits each link two cores in common with every column circuit in the same face of one of said planes, such row circuit linkage being in opposite senses in such two cores.

9. In combination, a memory having a plurality of storage elements arrayed along predetermined sets of coordinates, each of said elements being a magnetic core having plural remanent flux states to which it can be selectively switched to store information, said cores being arranged on at least first and second planes, on both front and back faces of each of such planes and in rows and columns corresponding to said sets of coordinates, respectively, a first plurality of circuits linking said cores along a first one of said sets of coordinates, a second plurality of circuits linking said cores along a second one of said sets of coordinates, said first and second pluralities of circuits linking cores in said rows and columns, respectively, each of said row and column circuits having first and second ends, and means energizing at least two circuits of said first plurality and at least two circuits of said second plurality for actuating selected ones of said elements, said energizing means comprising, first means interconnecting said first plurality of circuits in different row circuit sets for providing at least one pair of longitudinal current paths in each set and for providing a metallic loop current path in each such pair of current paths, second means interconnecting said second plurality of circuits in different column circuits sets for providing at least one pair of longitudinal current paths in each set and for providing a metallic loop current path in each such pair of current paths, each of said row and column circuit sets including circuits linking cores on different ones of said faces, and in each of said row and column circuit sets all circuits linking cores in either face of the same one of said first and second planes have first ends thereof connected to a common terminal, a plurality of transformers each having a center tapped primary winding, each of said primary windings being connected between the common terminals of said circuits of the same set in different ones of said planes, control means energizing said row and column circuit sets so that each said row and column circuit set includes only one energized row circuit in the same face of a plane as an energized column circuit, said control means including means selectably applying drive current to center taps of different ones of said transformers, and means selectively coupling together the second ends of different pairs of said circuits in the same circuit sets, but in different ones of said planes, to complete said metallic loop current path for each such pair of circuits.

10. The combination in accordance with claim 9 in which said control means include sensing means coupled to secondary windings of said transformers.

11. The combination in accordance with claim 9 in which said selective coupling means includes means coupling together corresponding ones of said circuit pairs in different ones of said column circuit sets, means coupling together corresponding ones of said circuit pairs in different ones of said row circuit sets, and means selectively activating different ones of said intercoupling means for each of said row and column coordinate sets.

12. The combination in accordance with claim 11 in which said selectively activating means comprises, means driving at least one selected circuit of said first plurality of circuits for producing the switching of storage elements coupled thereto from one predetermined state to another, means sensing signals produced on a circuit of said second plurality of circuits in response to said switching of storage elements, means, responsive to a predetermined state of signals applied to said sensing means on the last-mentioned circuit of said second plurality of circuits, driving said last-mentioned circuit for producing the switching of storage elements coupled thereto, and means sensing signals produced on circuits of said first plurality of circuits in response to said driving of said last-mentioned circuit.

13. The combination in accordance with claim 11 in which said control means comprises means applying drive current to one of said circuit sets along a first of said sets of coordinates and to a plurality of said circuit sets along a second of said sets of coordinates, means sensing the output of at least one of said second coordinate circuit sets, and said drive current applying means being responsive to said output for driving said one second coordinate circuit and a plurality of said first coordinate circuit sets.

14. The combination in accordance with claim 9 in which said selective coupling means comprises multiarm diode bridge switches.

15. The combination in accordance with claim 14 which comprises in addition, resistor means connected across said bridge switches, means applying bias current to selected ones of said switches to enable conduction therein of drive and loop current signals in said coordinate circuits, said bias current devoloping a potential difference across said resistor means for reversely biasing nonselected ones of said switches, and means short-circuiting said resistor means during a drive interval and for a predetermined time after the start of such interval.

16. The combination in accordance with claim 15 in which each of said switches includes a diode bridge and a transformer applying bias current to said bridge, said transformer having secondary winding means connected in series with said resistor means across said diode bridge.

17. The combination in accordance with claim 9 in which said selective applying means for drive current include in each coordinate set connections applying drive current in series between transformer center taps of couplets of circuit sets, and means selectively by-passing each circuit set.

18. The combination in accordance with claim 17 in which said control means comprises means supplying data signals, means supplying address signals defining specific core locations in said memory, and means controlling said selective by-passing means from one of said data or address signal supplying means.

19. The combination in accordance with claim 17 in which in each said coordinate set each couplet of circuit sets is connected for alternative energization with another one of said couplets by said selective applying means, and each of said selective by-passing means simultaneously by-passes corresponding circuit sets of each of the circuit couplets connected for alternative energization.

20. The combination in accordance with claim 19 in which means are provided for selecting the polarity of drive current applied by said selective applying means.

21. The combination in accordance with claim 20 in which said control means comprises means supplying address signals, means supplying signals for directing storage or reading of information in said cores, means coupling said address signals to control said polarity selecting means for circuit sets in a first of said coordinate sets to produce a first current polarity for reading a predetermined core address, and a second polarity for storage at the same address, and means coupling said directing signals to control said polarity selecting means for circuit sets in a second of said coordinate sets to produce a first current polarity for reading and a second polarity for storage.

References Cited

UNITED STATES PATENTS

| | | | |
|---|---|---|---|
| 3,432,835 | 3/1969 | Foglia | 340—174 |
| 3,483,536 | 12/1969 | Illenberger | 340—174 |

BERNARD KONICK, Primary Examiner

S. B. POKOTILOW, Assistant Examiner